United States Patent [19]

McCardle, Jr. et al.

[11] 4,000,611
[45] Jan. 4, 1977

[54] VARIABLE AREA, LOAD BALANCING NOZZLE

[75] Inventors: Arthur McCardle, Jr., Greenhills; John J. Wright, Monroe, both of Ohio; Jarod L. Baugh, Waco, Tex.

[73] Assignee: General Electric Company, Cincinnati, Ohio

[22] Filed: July 1, 1975

[21] Appl. No.: 592,107

[52] U.S. Cl. ............................ 60/230; 60/271; 239/265.37; 244/12.5
[51] Int. Cl.² ............................................ F02K 1/12
[58] Field of Search ............... 60/230, 271, 232; 239/265.33, 265.35, 265.37, 265.41, 265.43, 265.39; 92/89; 137/15.1, 15.2; 244/12 D

[56] References Cited
UNITED STATES PATENTS

| | | | |
|---|---|---|---|
| 3,019,601 | 2/1962 | Sens | 239/265.37 |
| 3,712,062 | 1/1973 | Nash | 60/39.65 |
| 3,739,987 | 6/1973 | Servanty | 239/265.39 |
| 3,833,187 | 9/1974 | Kahler et al. | 244/12 D |
| 3,863,867 | 2/1975 | Souslin et al. | 244/12 D |
| 3,897,907 | 8/1975 | Colley | 239/265.39 |

*Primary Examiner*—Carlton R. Croyle
*Assistant Examiner*—Robert E. Garrett
*Attorney, Agent, or Firm*—Robert C. Lampe, Jr.; Derek P. Lawrence

[57] ABSTRACT

A variable area exhaust device is provided for a gas turbine engine, with the actuation thereof being achieved by means other than conventional actuators. Area variation is accomplished by means of a rotatable duct section forming the downstream extremity of the exhaust device. A portion of the duct comprises a nozzle flap and another portion comprises a piston disposed in a pressure plenum and adapted to at least partially balance the exhaust gas loads on the flap portion to facilitate actuation thereof.

24 Claims, 5 Drawing Figures

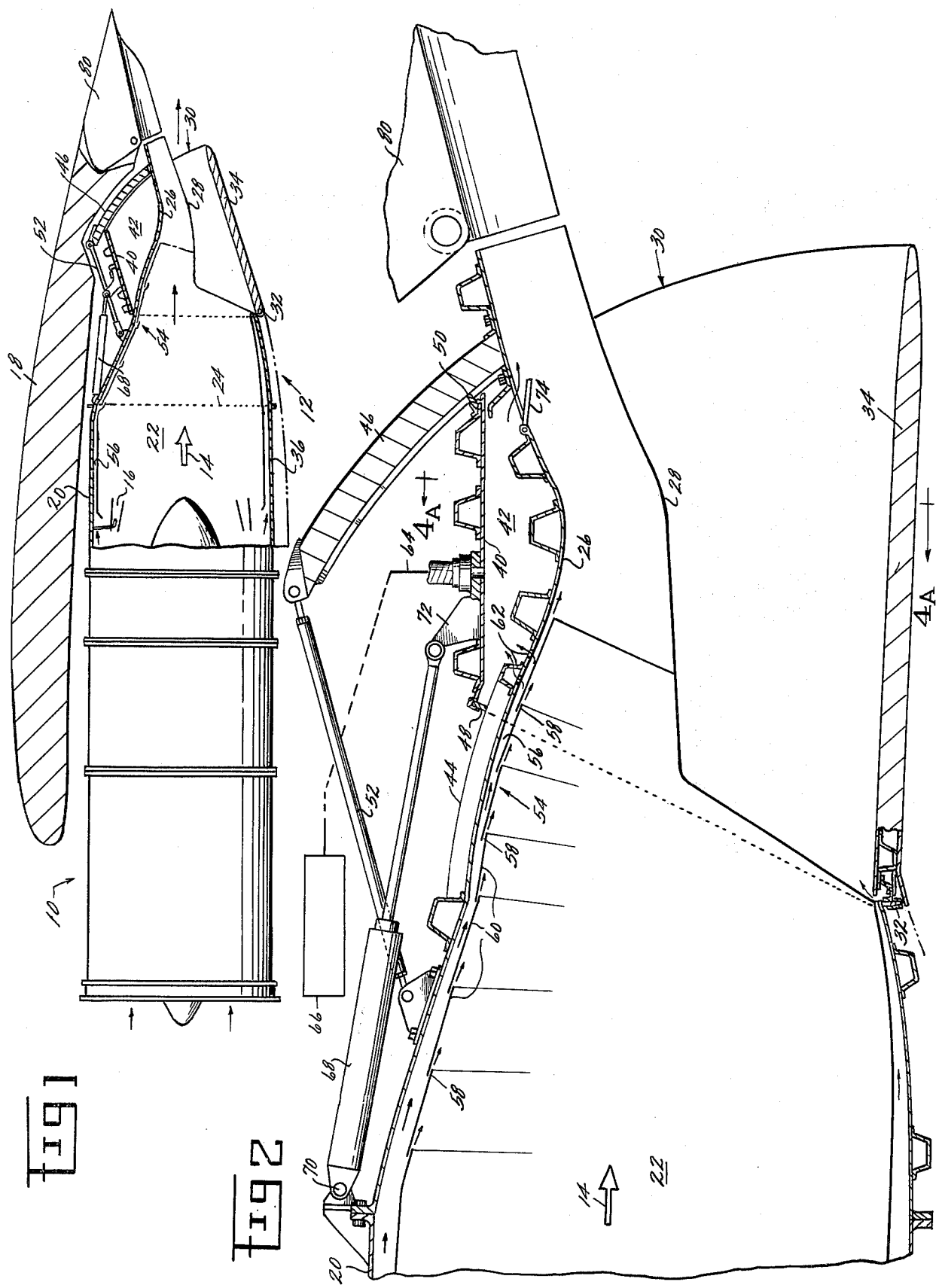

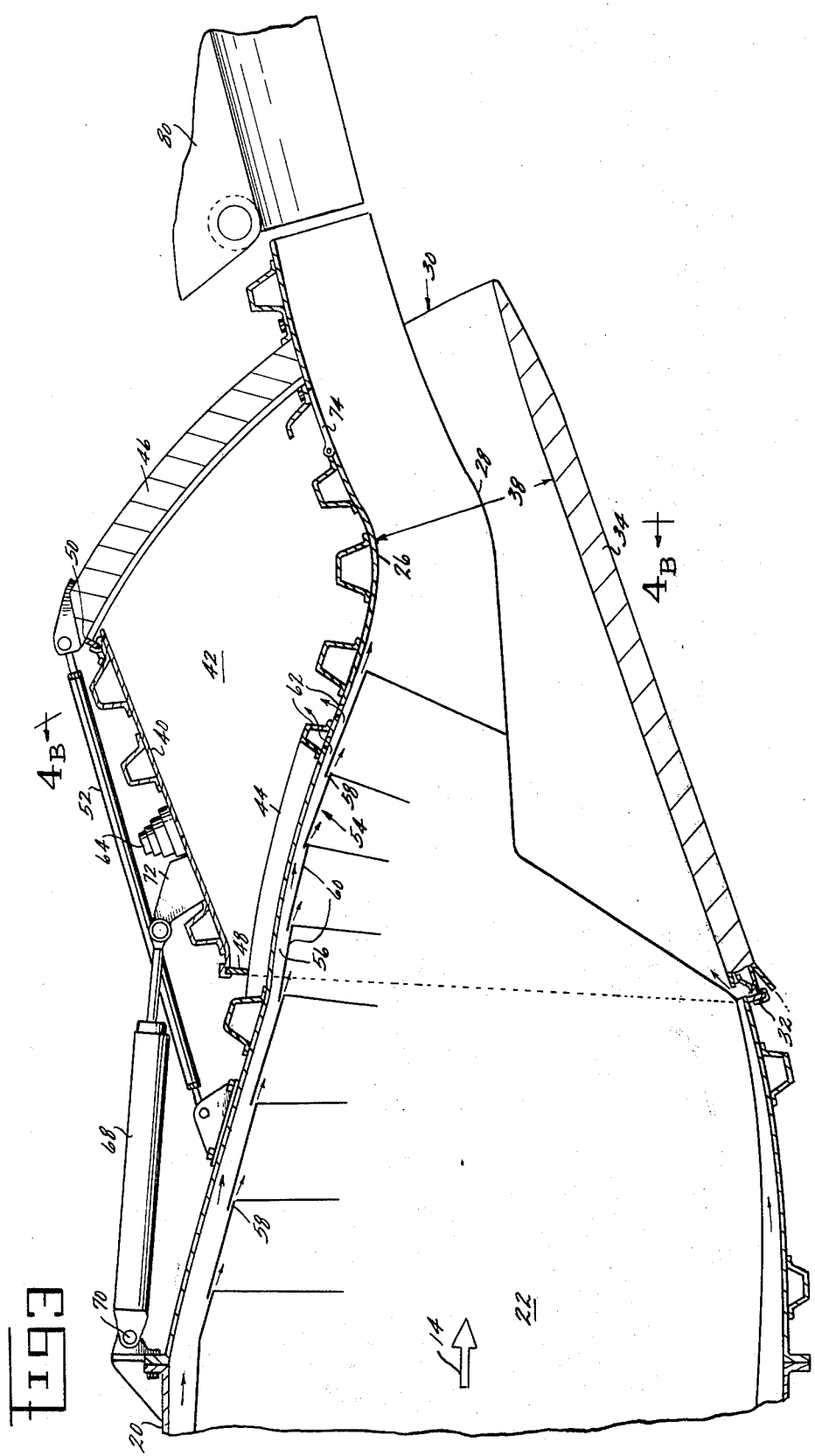

VARIABLE AREA, LOAD BALANCING NOZZLE

BACKGROUND OF THE INVENTION

This invention relates to gas turbine engines and, more particularly, to variable area exhaust nozzles for use therein.

The invention herein described was made in the course of or under a contract, or a subcontract thereunder, with the United States Department of the Air Force.

In modern, high-speed, multimission aircraft a requirement frequently exists for the gas turbine engines to have an augmented thrust (afterburning) capability. This necessitates large nozzle exit area variations as the engine switches between the augmented and non-augmented modes. In the subsonic, non-augmented mode the nozzle exit area is considerably smaller than the maximum engine diameter. Whether the engines are mounted within pods or within the aircraft structure (wing or fuselage), rapid external cross-sectional area closure rates are experienced. In other words, the external flowpath of the engine converges rapidly to the nozzle exit. These high area closure rates quite often result in high pressure drag.

Pressure drag penalties are incurred because air flowing along the aircraft surfaces, for example, may wholly or partially separate from the afterbody (or convergent) surfaces due to rapid contour changes associated with the aforementioned high closure rate. Separation of flow will usually create reduced pressures (below ambient) on the afterbody surfaces with a resultant increase in aircraft drag. A region particularly vulnerable is that between round axisymmetric nozzles of laterally adjacent engines operating at non-augmented power levels. This region is particularly difficult to fill with high energy ambient air because of the diverging nature of the space between nozzles and the complex flow field involved. Efforts to fill this space with mechanical structure to improve the area distribution have been only marginally successful due to the variable area requirements for the round axisymmetric exhaust nozzles.

One solution to this problem is to contour the exhaust nozzle such that it conformably mates with the adjacent structure, the preferred profile being asymmetric rather than axisymmetric, and a convenient shape being substantially elliptical or rectangular. Thus, if a substantially rectangular or elliptical exhaust nozzle were placed under a flat wing or fuselage, or adjacent to another engine, there would be substantially fewer voids to create afterbody pressure drag.

Both analytical studies and scale model wind tunnel performance tests have shown that aerodynamically blended asymmetric exhaust systems can provide significant reduction in nozzle/nacelle drag relative to round nozzles, as much as 10 percent of total aircraft drag. This is accomplished by providing a more gradual overall nacelle area closure rate, even at dry power conditions, and by providing a better aerodynamic blend of the exhaust system with the airframe nacelle, thereby eliminating locally severe area distributions. In particular, the space between adjacent nozzles of closely spaced engines is minimized, thereby avoiding one source of severe pressure drag.

Asymmetric nozzles, however, because of their non-circular cross section, create difficult mechanical design challenges due to large structural bending moments, stresses and the large actuation forces where area variation is incorporated. Since nozzle area variation is desirable for efficient operation of a gas turbine engine throughout the aircraft flight regime and is required for afterburning operation, it is advantageous to provide the asymmetric nozzle with this capability. Furthermore, it is desirable to provide a variable area nozzle having a minimum potential for flow leakage since a loss of exhaust flow through nozzle flaps or seals results in an equivalent loss in engine thrust.

To satisfy these requirements it becomes convenient to displace or rotate one portion of an asymmetric nozzle with respect to the remainder such that essentially one wall (herein denominated as a flap) of the rotated portion controls the area variation of the nozzle. Due to the large area of this flap, large actuation forces are required to move it against the exhaust pressure, thereby necessitating heavy actuators and associated hardware such as power supplies (pumps) and load-bearing structure. Since weight is a primary consideration in designing any aircraft component, it becomes desirable to reduce, and if possible to eliminate, the weight of an asymmetric exhaust nozzle area variation mechanism.

Furthermore, it is desirable to provide an asymmetric exhaust nozzle which possesses high internal aerodynamic performance in conjunction with low afterbody drag and variable geometry characteristics. Several prior attempts at providing area variation in an asymmetric nozzle have resulted in configurations wherein discontinuities in the internal aerodynamic flow path were present in one or more of the nozzle operative modes. It can be appreciated that such loss-creating mechanisms in the internal flow path, in addition to the flow leakage hereinbefore mentioned, can offset the substantial benefits obtainable through asymmetric contouring of the external profile.

SUMMARY OF THE INVENTION

Accordingly, it is an object of the present invention to provide a variable area exhaust nozzle which greatly reduces afterbody drag when combined with an aircraft structure.

Another object of the present invention is to provide a nozzle with a variable exhaust throat area and to provide the necessary area variation with minimum leakage potential.

It is yet another object of the present invention to provide an asymmetric nozzle which incorporates a reduced weight area variation mechanism.

These and other objects and advantages will be more clearly understood from the following detailed description, drawings and specific examples, all of which are intended to be typical of rather than in any way limiting to the scope of the present invention.

Briefly stated, the invention is directed to a low-afterbody drag nozzle arrangement for a gas turbine engine having variable flow path geometry. While not so limiting, a preferred arrangement generally includes a substantially circular stationary casing structure which transists to a generally C-shaped portion and terminates in a generally elliptical, variable position, duct section pivotably disposed about the C-shaped portion and pivotable thereabout. The pivot-connecting wall of the duct section forms a flap on the downstream extremity of the generally circular casing and cooperates with the opposing C-shaped casing structure to form a variable area nozzle throat therebetween.

To counter the high actuation forces created by the exhaust pressure on the large area of the one-piece flap, a unique, pressure-balanced piston system has been developed. This pressure balance system utilizes a portion of the pivotable duct section as a balance piston. In particular, the wall segment generally opposite the flap is disposed outside the C-shaped nozzle exhaust flow path and within the casing structure and functions as a piston. A plenum formed by stationary structure within the casing receives the piston in sliding relationship. By bleeding air from a compression means, such as the engine compressor or fan assembly, actuator loads required to position the flap are substantially reduced or eliminated. In other words, the compressed air actuates the piston which, in turn, is operatively connected to the flap.

In another embodiment wherein the pressure within the plenum is insufficient to overcome the flap loading, supplementary actuators are operatively connected to the piston. The entire nozzle arrangement may be duplicated in a pair of laterally adjacent engines, the substantially elliptical, or rectangular, profile significantly reducing the afterbody drag of the system.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 diagrammatically depicts, in partial cut-away, a wing-mounted gas turbine engine incorporating the present invention;

FIG. 2 is an enlarged view of a portion of the engine of FIG. 1 depicting the exhaust device in one operating mode;

FIG. 3 is an enlarged view, similar to FIG. 2, depicting the exhaust device in a second operational mode;

DESCRIPTION OF THE PREFERRED EMBODIMENT

Figure 4:
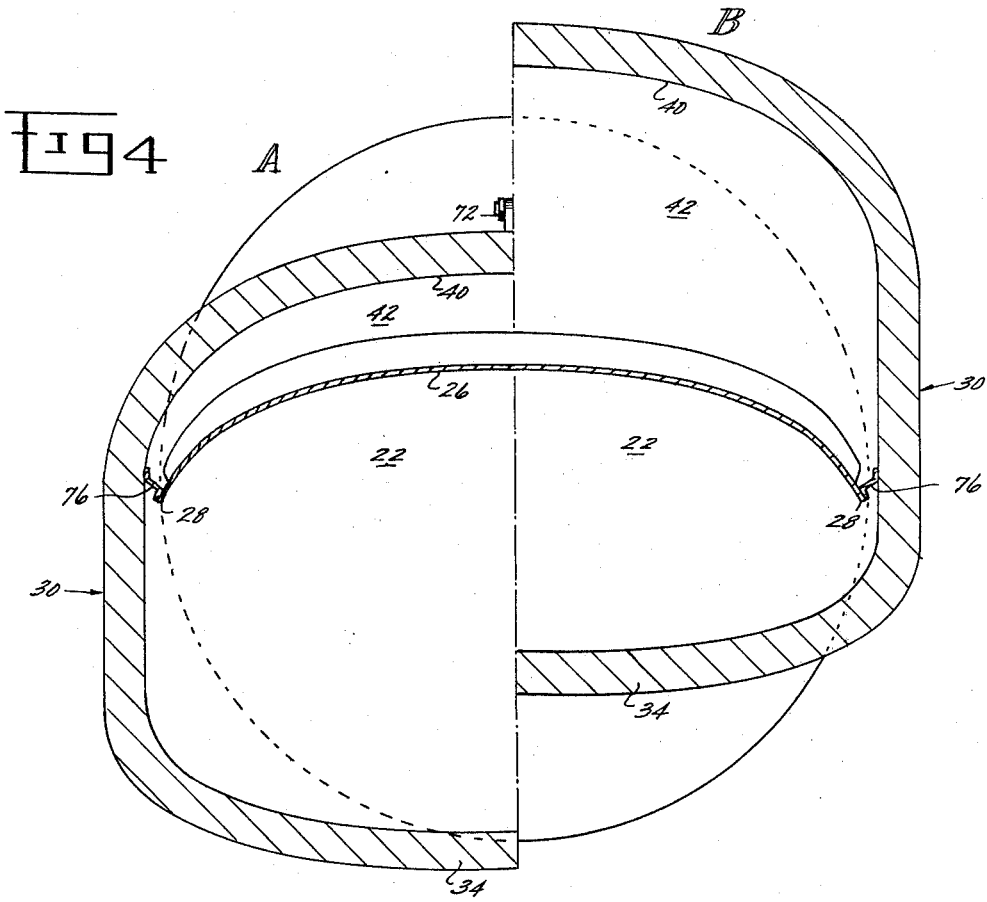
FIG. 4 is a composite cross-sectional view, taken along line 4A—4A of FIG. 2 and line 4B—4B of FIG. 3, of the exhaust device of the present invention.

Referring the drawings wherein like numerals correspond to like elements throughout, attention is first directed to FIG. 1 wherein a gas turbine engine, depicted generally at 10 and which can embody the present invention, is diagrammatically shown. Hot gases of combustion are expanded through a turbine (not shown) in a manner well known in the art and enters exhaust device 12 from the left as depicted by vector 14. In another embodiment, the hot gases of combustion may be mixed with fan discharge air prior to entering exhaust device 12. As used hereinafter, the term "exhaust device" is meant to include a fan duct exhaust nozzle, or any other gas turbine engine exhaust nozzle, whether or not it is preceded in serial flow relationship by a combustor. In the embodiment of FIG. 1, the gas turbine engine has been augmented by an afterburner 16 of a variety known in the art.

As can readily seen from FIGS. 1 through 3, the exhaust system depicted is of the internal-external expansion type with internal nozzle area variation. As will be shown, such a system can be conformably nested with an aircraft wing 18, for example, to provide an aerodynamically streamlined package which lacks the voids characteristic of high afterbody drag systems and generally caused by two or more laterally adjacent engines with round nozzles.

The exhaust device is shown to comprise, proximate the turbine a generally cylindrical casing 20 defining an exhaust gas flow path 22. Since it is desirable to reduce afterbody drag, the casing 20 gradually transists to a generally elliptical cross section starting at approximately the vicinity of 24, and converges to form a fixed position internal ramp 26. This ramp, being an integral portion of the fixed casing structure 20, serves as a flow guide and aids achievement of high nozzle internal performance for all nozzle area settings.

Continuing rearwardly, it is observed that the casing transists into a C-shaped cross section in the form of a scoop with the opening of the C pointing downward and partially defined by a generally axially extending surface 28. In other words, a segment of the axially extending elliptical casing has been removed along surface 28 leaving a circumferentially discontinuous duct which, but for the succeeding elements, would allow the exhaust gases to expand radially downward.

A generally elliptical duct section 30 is pivotably disposed about the C-shaped ramp portion 26 of casing 20 and forms the downstream extremity of casing 20 at 32 where the two structures are pivotably connected. Thus, in the cross-sectional view of FIGS. 2 and 3, duct section 30 forms a variable position flap 34 upon the downstream extremity of lower casing wall 36, the flap cooperating with the fixed position ramp 26 to form a variable position throat 38 therebetween (the throat being defined as the minimum cross-sectional area within flow path 22). The size of the throat area is a function of the operating mode of the engine and aircraft and is varied either by crew command or automatically in accordance with engine requirements to optimize performance as is well understood in the art. Typically, the nozzle area is open during a low altitude take-off and at the appropriate altitude after take-off, depending on the aircraft, the nozle is closed in order to achieve necessary cruise thrust. In the present invention, nozzle throat area variation is achieved by rotating duct section 30 about its pivot point 32, thus altering the position of flap 34 relative to ramp 26.

To at least partially counter the high actuation forces created by the thrust of gas pressure on the large surface area of the one-piece flap, a unique pressure balance piston system has been developed. This system utilizes a portion 40 of the pivotable duct 30 as a balance piston (hereinafter denominated as piston 40). Piston 40 is the segment of the duct 30 generally opposite flap 34 and which is disposed externally of flow path 22 within the wall segment defined by ramp 26.

A pressure plenum 42 located within casing 20 serves as a cylinder for receiving piston 40 in sliding relationship therewith. In particular, in the embodiment of FIGS. 2 through 4, the plenum is defined by ramp 26, two arcuate sealing surfaces 44 and 46 and the piston 40 which is disposed between the sealing surfaces 44 and 46. In addition to providing a sealing seat for the resilient seals 48 and 50, attached to piston 40, surfaces 44 and 46 also serve as guides to direct the travel of piston 40 along the arcuate path therebetween. Supports 52 (only one of which is shown in FIGS. 2 through 4) extending between casing 20 and sealing surface 46 provide rigidity to the surface 46 which, in cross section, is cantilevered off of ramp 26.

Thermal liner 54 is disposed within casing 20 in spacial relationship thereto to form a passage 56 therebetween. While not meant to be limiting, the liner is shown to be of the singled liner variety which permits a flow of cooling air within passage 56 to be dispersed through apertures 58 between overlapping liner segments 60 to form a cooling film along the radially inward side thereof. Such a thermal liner is taught and claimed in U.S. Pat. No. 3,712,062, D. O. Nash, which is assigned to the assignee of the present invention.

It will become clear that actuation of piston 40 may be accomplished in two distinct modes. First, where the available pressure in plenum 42 is sufficient to overcome the flap forces, movement of piston 40 may be accomplished solely by regulating the amount of pressure within the plenum. In a second mode where the pressure within plenum 42 is insufficient to overcome the flap forces, supplemental actuators are required.

Since the flow of cooling air is typically obtained from the discharge of the turbine or fan portion of a gas turbine engine, it becomes convenient to utilize the same source for pressurization of plenum 42. In particular, means such as apertures 62 are provided to pass pressurized air into balance plenum 42 as necessary to actuate piston 40 in a manner to be discussed. However, it will become apparent to one skilled in the art that any suitable means may be provided to supply pressurized air into plenum 42 and that this invention is not limited by the configuration of FIG. 3. Accordingly, FIG. 2 indicates a generalized passage 64 which fluidly connects pressure plenum 42 with a generalized compression source 66.

In operation, assuming that the duct 30 is positioned as in FIGS. 2 and 4A and it is desirable to reduce the throat area 38, pressurized fluid such as air is bled into plenum 42. The relatively high pressure air acting upon the surface area of piston 40 creates a force in opposition to that created by the exhaust gas acting upon the surface area of flap 34. As discussed hereinbefore, if the force on the piston exceeds the force on the flap, the duct 30 will pivot counterclockwise about pivot 32 to the position depicted in FIGS. 3 and 4B.

If the force is less than that on the flap, supplemental actuating means are required to make up the difference. Thus, actuators 68 have been provided to supplement the pressure balance plenum system. The actuators are operatively connected at one end to the casing 20 by pivot 70 while being operatively connected at their other end to piston 40 through clevis 72. These actuators may be of any known variety, preferably of the hydraulic or pneumatic type. It can be appreciated that, since actuators 68 serve merely a supplementary role when the force exerted on piston 40 is less than that exerted on flap 34, the size of the actuators is substantially less than where they must provide the primary means for actuation. Therefore, the weight of the system may be reduced.

The sequence of events is reversed where it is desired to increase the throat area 38. The pressure within the plenum 42 is reduced to where the force on the piston is less than that on flap 34, causing the duct 30 to rotate clockwise about pivot 32. As the plenum size is reduced, the air therein is forced out through either the same means by which it entered or through outlet valves such as at 74. Similarly, if actuators 68 have been provided, and if the forces acting upon piston 40 and flap 34 were maintained substantially equal, the actuators would be able to position duct 30 with relative ease. Thus, an actuation mechanism for a variable area asymmetric nozzle has been provided which is of minimum complexity and weight.

Further, the nozzle system provided includes a reduced potential for exhaust gas leakage. Since duct 30 is of continuous construction, and since seals 48, 50 preclude leakage between piston 40 and sealing surfaces 44, 46, respectively, the only remaining potential leakage path is between the pressure balance piston 40 and ramp portion 26 of casing 20. However, this passage is restricted as indicated in FIG. 4 by means of seals 76 which are depicted to be of the spring seal variety, but which could be of several known varieties without departing from the broad intent of the present invention.

Figure 5:
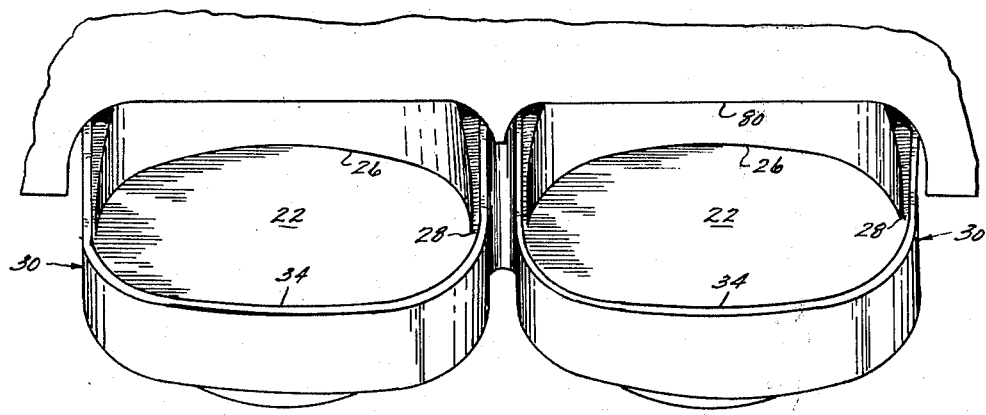
FIG. 5 depicts the aft view of a representative installation of the exhaust device of the present invention in an aircraft.

FIG. 5 depicts an integration of two engines incorporating the subject exhaust nozzle with an aircraft wing section 80. It is readily apparent that the smooth blending of the subject nozzle into the wing results in greatly reduced afterbody drag since voids which create external air separation have been eliminated as hereinbefore discussed. Additionally, the present invention provides an aerodynamically smooth internal and external nozzle flow path and thereby minimizes pressure losses caused by steps in the side walls. In particular, the ducts 30 and casing 20 can be easily contoured at their region of telescopic cooperation as indicated in FIG. 4.

Another interesting feature of the subject nozzle is that if wing section 80 comprises a wing flap (FIGS. 1 through 3) the flap 34 may be positioned in predetermined relationship with wing flap 80 to provide for a degree of thrust vectoring, and controls may be devised to accomplish such a function.

It should be obvious to one skilled in the art that certain changes can be made to the above-described invention without departing from the broad inventive concepts thereof. For example, the engines may be mounted in side-by-side relationship within pods affixed to the aircraft wing or fuselage, or may be directly mounted within the wing or fuselage. In an embodiment wherein an engine is rotated approximately 90°, the ramp 34 may be mounted entirely upon the aircraft fuselage. Furthermore, in other embodiments, the actuators 68 may be mounted to the aircraft structure or be disposed within the plenum. Additionally, it is intended that the invention be applicable to all types of gas turbine engines, whether of the turbofan, turbojet, afterburning variety or otherwise. Still further, the concept of the pressurebalanced flap is applicable to nozzles of cross section other than elliptical. It is intended that the appended claims cover these and all other variations in the present invention's broader inventive concepts.

What we claim is:

1. An exhaust device for a gas turbine engine comprising:
   a casing defining, to its interior, an exhaust fluid flow path and, partially defining, to its exterior, pressure plenum means;
   a variable position flap spaced from said casing to define said exhaust fluid flow path therebetween to control flow path area; and
   piston means operatively connected to the flap, said piston means partially defining the plenum means and exterior to the flow path; wherein said plenum means and said piston means comprise a first actuation means to at least partially balance exhaust pressure loads on the flap.

2. The exhaust device of claim 1 wherein said plenum means communicates with a source of compressed air which provides the force to actuate said piston means.

3. An exhaust device for a gas turbine engine comprising:
 a casing defining, in part, an exhaust fluid flow path and open at opposing ends to accommodate the passage of exhaust fluid therethrough;
 a variable position flap to control flow path area; and
 first flap actuation means comprising variable area pressure plenum means defined, in part, by said casing, and pistion means disposed within the plenum means and operatively conected to the flap to at least partially balance exhaust pressure loads on the flap; wherein
 the flap and the piston means cooperate to form a variable position duct further defining the exhaust fluid flow path, said duct receiving a portion of the casing within one end thereof and adapted to pivot about and axis generally perpendicular to the casing longitudinal axis.

4. The exhaust device of claim 3 wherein the portion of the casing received within the duct is of generally C-shaped cross section.

5. The exhaust device of claim 3 wherein the flap and the pistion means are generally opposed to each other.

6. The exhaust device of claim 3 wherein the flap and the piston means cooperate to form a circumferentially continuous inegral duct.

7. The exhaust device of claim 3 wherein said flap comprises a downstream etremity of said exhaust device.

8. The exhaust device of claim 1 wherein the plenum means is further defined by at least one arcuate sealing surface means.

9. The exhaust device of claim 8 wherein the piston means is adapted to pivot within said plenum means.

10. The exhaust device of claim 8 wherein sealing means are disposed between the piston means and the sealing surface means.

11. The exhaust device of claim 1 further including second flap actuation means operatively connected to the piston means, and wherein the first actuation means and the second actuation means each provide a portion of the actuation force necessary to position the flap.

12. The exhaust device of claim 11 wherein the second flap actuation means is of the hydraulic variety.

13. The exhaust device of claim 3 wherein the variable position duct is hinged to the casing.

14. The exhaust device of claim 1 wherein the variable position flap cooperates with the casing to define a minimum flow path area throat therebetween.

15. The exhaust device of claim 1 further including a thermal linter liner within the casing and forming a cooling passage therebetween, said cooling passage receiving a source of pressurized air from a compression means and wherein the cooling passage is fluidly connected to the plenum.

16. The exhaust device of claim 15 wherein the means for fluidly connecting the cooling passage and the plenum comprises aperture means disposed within said casing.

17. The exhaust device of claim 3 wherein said duct is substantially elliptical in cross section.

18. The exhaust device of claim 3 further including a deflector member cooperating with the flap to vector the exhaust fluid.

19. An exhaust device for a gas turbine engine comprising:
 a casing defining, in part, an exhaust fluid flow path and open at opposing ends to accommodate the passage of exhaust fluid therethrough; and
 a variale position duct further defining the exhaust fluid flow path, said duct receiving a portion of the casing within one end thereof and adapted to pivot about an axis generally perpendicular to the casing longitudinal, wherein:
 a first portion of the duct forms a flap which cooperates with the casing to control flow path area therebetween, and
 a second portion of the duct, generally opposed to the first portion thereof and comprising a piston means which is adapted to be acted upon by a source of pressurized fluid to facilitate actuation of said flap.

20. The exhaust device of claim 19 wherein said piston means is disposed within a pressure plenum means formed, in part, by arcuate sealing surface means.

21. The exhaust device of claim 20 wherein:
 said casing includes a convergent ramp portion; and
 said ramp portion and said flap cooperation to form a throat therebetween.

22. The exhaust device of claim 20 wherein the portion of the casing received by the duct is of generally C-shaped cross section.

23. The exhaust device of claim 19 wherein the first portion of the duct is hinged to the casing.

24. The exhaust device of claim 19 wherein the piston means is adapted to balance the forces of the exhaust fluid upon the flap.

* * * * *

UNITED STATES PATENT AND TRADEMARK OFFICE
CERTIFICATE OF CORRECTION

PATENT NO. : 4,000,611
DATED : January 4, 1977
INVENTOR(S) : Arthur McCardle, Jr., John J. Wright, Jarod L. Baugh It is certified that error appears in the above-identified patent and that said Letters Patent are hereby corrected as shown below:

| | |
|---|---|
| Column 7, line 15, | "conected" should be --connected--; |
| Column 7, line 22, | "about and axis" should be --about an axis--; |
| Column 7, line 32, | "inegral duct" should be --integral duct--; |
| Column 7, line 34, | "etremity" should be --extremity--; |
| Column 8, line 5, | "thermal linter liner within" should be --thermal liner disposed within--; |
| Column 8, line 24, | "a variale position duct" should be --a variable position duct--; |
| Column 8, line 28, | "longitudinal, wherein: " should be --longitudinal axis, wherein: --; and |
| Column 8, line 43, | "cooperation" should be --cooperate--. |

Signed and Sealed this

Nineteenth Day of April 1977

[SEAL]

Attest:

RUTH C. MASON
*Attesting Officer*

C. MARSHALL DANN
*Commissioner of Patents and Trademarks*